No. 667,389. Patented Feb. 5, 1901.
J. H. FOOTE.
CHURN.
(Application filed Feb. 26, 1900.)

(No Model.) 2 Sheets—Sheet 1.

Attest.
Emma Lyford
J. C. Maphet

Inventor.
James H. Foote
By Murray & Murray
his Atty.

THE NORRIS PETERS CO., PHOTO-LITHO., WASHINGTON, D. C.

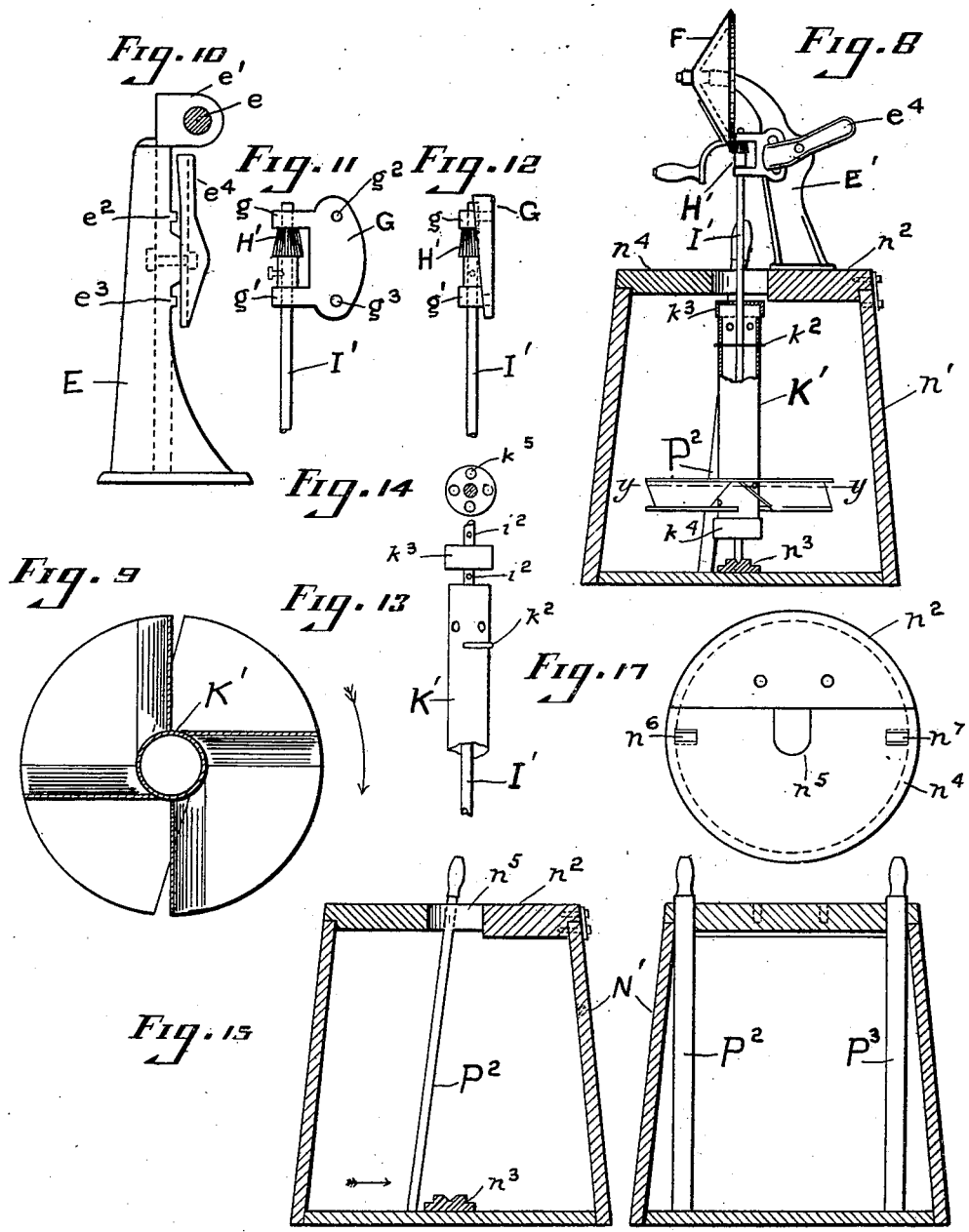

UNITED STATES PATENT OFFICE.

JAMES H. FOOTE, OF CINCINNATI, OHIO.

CHURN.

SPECIFICATION forming part of Letters Patent No. 667,389, dated February 5, 1901.

Application filed February 26, 1900. Serial No. 6,475. (No model.)

*To all whom it may concern:*

Be it known that I, JAMES H. FOOTE, a citizen of the United States of America, and a resident of Cincinnati, in the county of Hamilton and State of Ohio, have invented certain new and useful Improvements in Churns, of which the following is a specification.

The object of my invention is a churn which separates the butter from cream while it is in its fresh state rapidly and effectually, and is accomplished by subjecting the cream to centrifugal and alternating downward and upward agitation while bringing it in contact and permeating it with inrushing air and in which the parts are few, simple, and readily taken apart for convenience and thoroughness in cleaning.

Figures 1, 7:
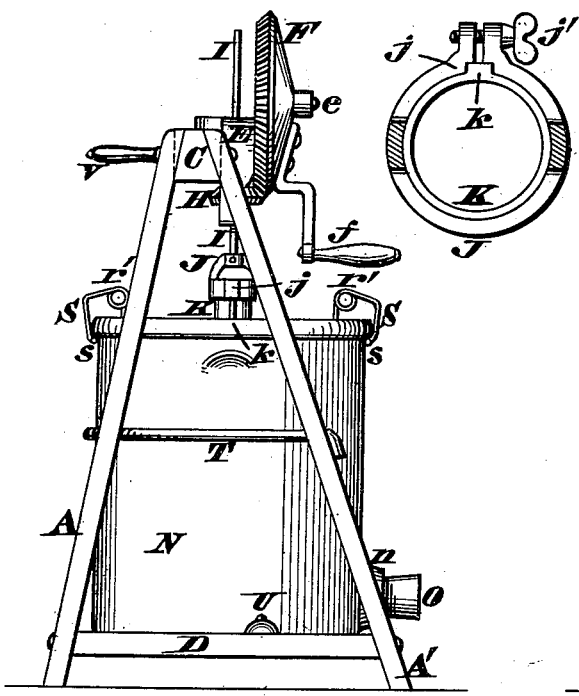
Figure 2:
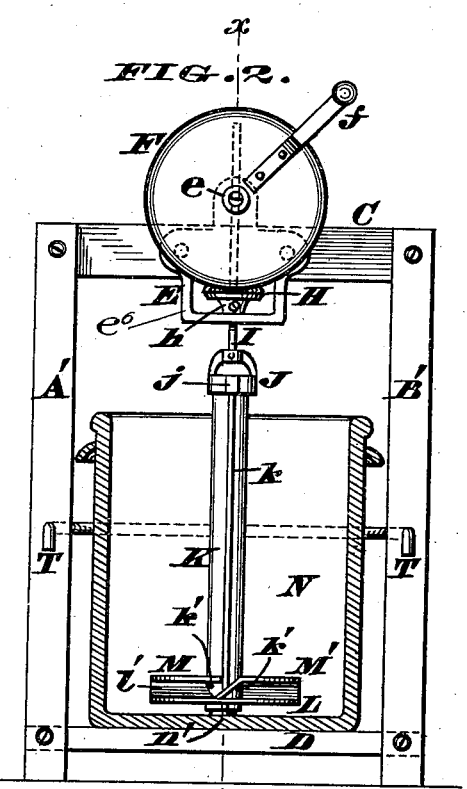
Figures 3, 4:
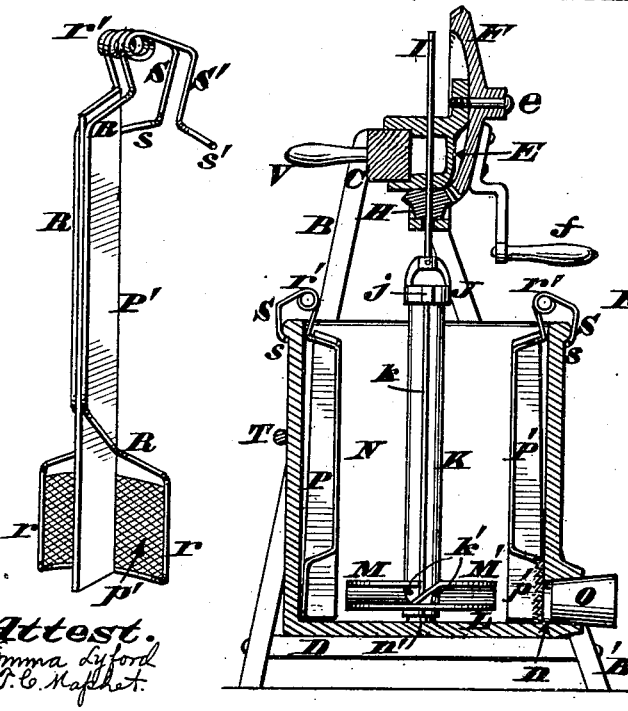
Figure 5:
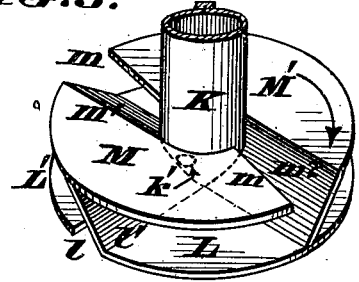
Figure 6:
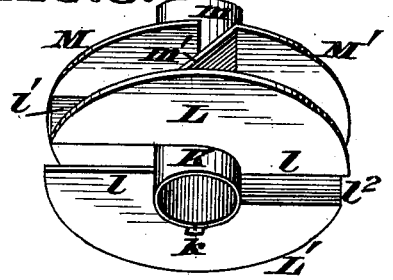

Referring to the accompanying drawings, in which like parts are indicated by similar reference-letters wherever they occur throughout the various views, Figure 1 is a side elevation of a churn embodying my invention. Fig. 2 is a front elevation of the same, but with the outer case or vessel shown in cross-section to expose the interior parts. Fig. 3 is a central transverse sectional view of the same, taken upon line $x\ x$ of Fig. 2, the dasher being shown in elevation. Fig. 4 is a detail perspective view, upon an enlarged scale, of one of the blades for breaking the centrifugal current of the cream. Fig. 5 is a detail perspective view of the dasher, looking from above, upon an enlarged scale, the top of the tube to which it is connected being shown broken off. Fig. 6 is a view similar to Fig. 5, looking from beneath. Fig. 7 is a detail cross-section of a modified form of coupling-collar. Fig. 8 is a central longitudinal section of a modified form of churn, the operative mechanism being shown in side elevation and the dasher partly in section and partly in side elevation. Fig. 9 is a horizontal cross-section, upon an enlarged scale, of the dasher, taken upon line $y\ y$ of Fig. 8. Fig. 10 is a detail front elevation of the standard for supporting the operative mechanism, upon an enlarged scale. Fig. 11 is a front elevation of the perforated lug-plate with the vertical shaft which carries the dasher journaled in its lugs, upon an enlarged scale. Fig. 12 is a detail rear elevation of the same. Fig. 13 is a partial detail view of the central tube, to the lower end of which the dasher is attached. Fig. 14 is a detail plan view of one of the removable caps closing the upper and lower ends of the tube. Fig. 15 is a detail central longitudinal sectional view of the outer case or tub. Fig. 16 is a detail central transverse sectional view of the same. Fig. 17 is a plan view of the cover of the tub.

Referring to Figs. 1 to 6, inclusive, the frame which supports the churn consists of standards A, A', B, and B', which support an upper cross-beam C centrally above a floor D. Centrally secured to cross-beam C is a bracket E, which has an upwardly-projecting lug to receive journal-pin $e$, upon which bevel gear-wheel F, which is to be rotated by crank $f$, is journaled. Bracket E has a downward-projecting hanger $e^6$, upon which rests a pinion H, whose teeth intermesh with gear-wheel F. Pinion H is secured by set-screw $h$ upon a vertical shaft I, which passes up through hanger $e'$ and bracket E and has secured to its lower end a coupling-collar J, which has a key-seat $j$ to fit over a spline $k$ upon tube K, which is journaled at its lower end upon a conical step $n$, which is centrally secured to or cast integral with the outer vessel N, which rests upon floor D and which has steps or studs U for centering the vessel vertically beneath bracket E. The frame may also support a circular arm T for steadying vessel N. Collar J may be split and the split ends be screw-threaded and provided with a screw $j'$ for tightening the collar upon tube K, as shown in Fig. 7. Secured to tube K near its lower end are horizontal semicircular plates L L' and M M'. At one end plates L and L' are bent upward at an angle into paddles $l'$ and $l^2$, which extend around tube K, up to the under side of plates M and M', and at the other end they are cut off, leaving passages $l$ between them and the paddles. Similarly plates M and M' are bent down at one end into paddles $m'$ and $m^2$, which extend down to plates L and L' at an angle to the vertical the reverse of that of paddles $l'$ and $l^2$, and at the other end of the plates passages $m$ are left between them and paddles $m'\ m^2$. At the four crotches formed by the plates and the paddles with the tube perforations $k'$ are formed in the tube for the exit of air from the tube into the cream in vessel N. At diametrically opposite points of the interior of vessel N blades P and P' are held by spring-wires R, each of which at its lower end is bent back upon itself to form spring-arms between which a blade is grasped, and at its upper ends is coiled into springs $r'$ and bent down into spring-arms S S' and spring-fingers $s\ s'$, which clasp the upper edge of the vessel to retain the blades in a substantially vertical position to break the centrifugal current of the liquid when churned. The spring-wire which clasps blade P' is bent at its lower end into a loop $r$, which holds a strainer $p'$ to strain the milk as it passes out of vessel N through spout $n$ in the bottom of the vessel N after stopper O has been removed therefrom.

In operation the dasher is caused to rotate rapidly in the direction of the arrow shown in Fig. 5 by turning wheel F toward the right. Paddles $m'$ and $m^2$ strike the cream and throw it upward and outward through the chambers formed between the upper and lower plates and paddles $l'$ and $l^2$, respectively, forming vacuums in the crotches, into which the air from tube rushes and meets and mixes with the agitated cream. Similarly paddles $l'$ and $l^2$ lash the cream and throw it outward and downward and cause the air from tube K to meet and mix with it. This thorough lashing and bringing of the cream in contact with the exterior air cause the tissue inclosing the globules of butter-fat to break and release the butter very rapidly. After the process of separating the butter from the cream is completed, to remove the tube and dasher from vessel N set-screw $h$ is loosened, shaft I, carrying collar J, is raised, and the tube and dasher lifted out.

In the modification shown in Figs. 8 to 17 journal-pin $e$, upon which wheel F is journaled, is secured in a lug $e'$ of a standard E', which is secured to the clamped part $n^2$ of the cover of vessel N'. Pinion H', which meshes with wheel F, is secured upon shaft I' between lugs $g\ g'$ of a lug-plate G, which has perforations $g^2\ g^3$ to fit over studs $e^2\ e^3$ upon standard E'. To the standard is pivoted a lever $e^4$, the inner face of whose short arm is beveled, so that when the lever is thrown down, as in Fig. 8, it bears against lug-plate G and holds it clamped to the standard, and when thrown up, as in Fig. 10, it releases the lug-plate, so that it may be disengaged from the standard. When lug-plate G is secured to standard E', shaft I' extends to the bottom of vessel N' and rests upon a step $n^3$ upon the bottom thereof. Tube K', at the lower end of which is a dasher similar to that shown in Figs. 2 and 3, surrounds shaft I', upon which it is held by a wire $k^2$, which passes through perforation $i^2$ upon the shaft. There are a series of these perforations, so that the dasher may be raised or lowered by passing the wire through a higher or lower perforation in the shaft, according to the depth of cream in the vessel. The dasher is centered on the shaft by an upper and a lower cap $k^3$ and $k^4$, in which are a series of perforations $k^5$ for the admission of air down through tube K'. The loose part $n^4$ of the cover has a central slot $n^5$ to accommodate shaft I' and tube K', and two slots $n^6$ and $n^7$ upon its edges, made at an angle to the vertical, to receive blades $P^2$ and $P^3$ for breaking the current of the cream, which are at an angle against the current of the liquid, (shown by arrow, Fig. 15,) which tends to hold them more securely in position the swifter the current.

To remove the dasher from vessel N', lever $e^4$ is thrown up, unclamping lug-plate G, which is then lifted from studs $e^2\ e^3$, carrying the shaft I', tube K', and the dasher with it.

The operation of the modification is the same as that already described.

What I claim is—

1. In a churn the combination of an outer vessel, a vertical tube journaled therein, a dasher consisting of upper and lower plates secured to the tube in substantially a horizontal position with ways between them at each of their ends, paddles at an angle to the vertical at one end of each of the upper plates extending down to the power-plates, and paddles at one end of each of the lower plates extending up to the upper plates at an angle to the vertical in a reverse direction to that of the former paddles, perforations in the tube between the upper and lower plates for the admission of air from the tube and means for revolving the tube, substantially as shown and described.

2. In a churn the combination of an outer vessel, a vertical tube journaled therein, a dasher secured to the tube consisting of an upper and lower series of separated plates, the upper series in a plane substantially parallel to that of the lower series, paddles at one end of each plate of the upper and lower series extending at an angle to the vertical to the plates of the opposite series, perforations in the tube between the upper and the lower plates, a pinion mounted above the tube, a wheel in mesh with the pinion for rotating it, and a shaft for coupling the pinion and the tube, substantially as shown and described.

3. In a churn the combination of a vessel, a dasher within the vessel, a vertical shaft journaled in the lugs of a lug-plate and coupled to the dasher, a pinion upon the shaft, the lug-plate, a standard mounted upon the vessel, a driving-wheel journaled upon the standard and a lever pivoted to the standard and having means whereby the throwing of the lever in one direction clamps the lug-plate to the standard and holds the pinion in mesh with the driving-wheel while the dasher revolves within the vessel and the throwing of which in the opposite direction releases the lug-plate from the standard for lifting the dasher out of the vessel, substantially as shown and described.

4. In a churn the combination of an outer vessel with an outlet near its bottom, a spring-wire bent at its lower end into a loop, a strainer secured to said loop and adapted to cover said outlet the upper ends of said wire being bent into spring-arms for grasping the upper edge of the vessel and its intermediate portions bent to form a clamp for holding a breaker within the vessel, substantially as shown and described.

JAMES H. FOOTE.

Witnesses:
WALTER F. MURRAY,
T. C. MAPHET.